(12) United States Patent
Chiu et al.

(10) Patent No.: US 8,916,127 B1
(45) Date of Patent: Dec. 23, 2014

(54) METHOD, APPARATUS AND SYSTEM FOR MAKING SULFURIC ACID

(71) Applicant: Green America Enterprises Ltd., Taoyuan, Taoyuan County (TW)

(72) Inventors: Hsien-Ping Chiu, Taoyuan County (TW); Chun-Ching Kao, Taipei (TW)

(73) Assignee: Green America Enterprises Ltd., Taoyuan (TW)

( * ) Notice: Subject to any disclaimer, the term of this patent is extended or adjusted under 35 U.S.C. 154(b) by 0 days.

(21) Appl. No.: 14/167,040

(22) Filed: Jan. 29, 2014

(30) Foreign Application Priority Data

Nov. 20, 2013 (TW) .............................. 102142361 A

(51) Int. Cl.
*C01B 17/69* (2006.01)
*C01B 17/80* (2006.01)
*C01B 17/74* (2006.01)

(52) U.S. Cl.
CPC ...................................... *C01B 17/74* (2013.01)
USPC ............ 423/522; 422/129; 422/160; 422/161

(58) Field of Classification Search
USPC .......................... 423/522; 422/160, 161, 129
See application file for complete search history.

(56) References Cited

U.S. PATENT DOCUMENTS 7,704,476 B2 * 4/2010 Daum et al. ................ 423/242.1
2005/0255022 A1 * 11/2005 Parrish et al. ............ 423/243.01

* cited by examiner

*Primary Examiner* — Timothy Vanoy
(74) *Attorney, Agent, or Firm* — Alan D. Kamrath; Kamrath IP Lawfirm, P.A.

(57) ABSTRACT

A method for making sulfuric acid comprises: providing solid sulfur, melting the solid sulfur into liquid sulfur in a sulfur melting tank, burning the sulfur to generate a sulfur product, recycling high order heat energy generated from burning the sulfur and providing the high order heat energy to a distillation tower, recycling low order heat energy generated from burning the sulfur and providing the low order heat energy to the sulfur melting tank, providing hydrogen peroxide or sulfuric acid containing hydrogen peroxide into an absorption-reaction tower for reacting to produce a sulfuric acid product, and concentrating or purifying the sulfuric acid product to improve its concentration or purity.

29 Claims, 2 Drawing Sheets

METHOD, APPARATUS AND SYSTEM FOR MAKING SULFURIC ACID

BACKGROUND OF THE INVENTION

1. Field of Invention

The present invention relates to a method, apparatus and system for making sulfuric acid, especially a method, apparatus and system capable of sufficiently recycling heat energy.

2. Description of Related Art

Sulfuric acid is a very important chemical compound and has extremely comprehensive industrial purposes. It not only may be used to manufacture fertilizers, non-alkaline detergent, skin care products, paint additives but also can be utilized to make explosives. Sulfuric acid plays the role of an essential material that many industries rely on, and the large market demand has been already reflected on the huge yield quantity. As a result, many local entrepreneurs in the world are attracted to invest on production of sulfuric acid. However, while each of the entrepreneurs smoothly mass-produces sulfuric acid, they still need to spend some efforts to keep on product improvement such that they can expect to increase efficiency of equipments, lower power consumption, reduce the manufacture cost, and then enhance economic benefit and competitiveness of enterprises.

Meanwhile, with advancement of technologies, not only traditional industries continue to develop, but also more and more innovative industries quickly grow up. When production capacities of these industries continuously expend, spent acid or waste acid is likely generated during manufacturing processes. For example, it needs to adopt extremely high purity sulfuric acid during cleaning semiconductors and add hydrogen peroxide solution in terms of a certain proportion to accelerate reaction speed and enhance cleaning effect. In such circumstance, the spent acid contains sulfuric acid and hydrogen peroxide. When the production capacities achieve to a certain level, the volume of generated waste sulfuric acid or waste acid will be quite enormous. The generated waste sulfuric acid or waste acid not only takes a portion of the manufacture cost but also needs adequate recycling through efforts of business entities to meet regulation requirements and prevent from contaminating the environment.

Therefore, it is very important to develop a method and apparatus for making sulfuric acid in order to not only produce sulfuric acid at high concentration, for satisfying the needs of industrial purposes and especially appropriate for reproducing high concentration sulfuric acid having economic value from recycled spent acid or waste acid, but also sufficiently recycle heat energy simultaneously, for lowering power consumption and then reducing the total manufacture cost.

SUMMARY OF THE INVENTION

Accordingly, one objective of the present invention is to provide a method for making sulfuric acid to sufficiently utilize recycled heat energy for proper reuse so as to lower power consumption and resolve the problem of wasting energy.

Another objective of the present invention is to provide an apparatus for making sulfuric acid to reproduce new sulfuric acid products from spent acid or waste acid discharged by factories.

Still another objective of the present invention is to provide a system for making sulfuric acid to achieve goals of power saving, reducing carbon emission, being environmental friendly and alleviating the Earth's burden.

The present invention provides a method for producing a sulfuric acid product, and the method comprises the following steps. First, solid sulfur is provided. Then, the solid sulfur is melted into liquid sulfur in a sulfur melting tank. Next, the liquid sulfur is burned to generate a sulfur product. High order heat energy generated from burning the liquid sulfur is recycled. The high order heat energy is provided to a first distillation tower and a second distillation tower. Low order heat energy generated from burning the sulfur is recycled. The low order heat energy is provided to the sulfur melting tank. Hydrogen peroxide or sulfuric acid containing hydrogen peroxide is provided into an absorption-reaction tower to produce the sulfuric acid product. The sulfuric acid product is concentrated or purified to improve its concentration or purity.

The present invention further provides an apparatus for producing a sulfuric acid product, and the apparatus comprises a sulfur melting tank, a combustion furnace, an ash collector, a first heat exchanger, a second heat exchanger, an absorption-reaction tower, a first distillation tower, a second distillation tower and a stripping tower. The sulfur melting tank is used to melt solid sulfur into liquid sulfur. The combustion furnace is used to burn the liquid sulfur and import at least a sulfur product into the first heat exchanger. The first heat exchanger is used to recycle high order heat energy generated from burning the liquid sulfur and deliver the high order heat energy to the first distillation tower and the second distillation tower through a first pipeline. The second heat exchanger is used to recycle low order heat energy generated from burning the liquid sulfur and deliver the low order heat energy to the sulfur melting tank through a second pipeline. The sulfur product reacts with hydrogen peroxide within the absorption-reaction tower to produce the sulfuric acid product. The first distillation tower and the second distillation tower are used to concentrate and purify the sulfuric acid product to improve the concentration and purity of the sulfuric acid product. The stripping tower is used to remove sulfur dioxide in the sulfuric acid product.

The present invention further provides a system for producing a sulfuric acid product, and the system comprises a sulfur melting tank, a combustion furnace, at least a heat exchanger, an absorption-reaction tower, at least a distillation tower and a stripping tower. The sulfur melting tank is used to melt solid sulfur into liquid sulfur. The combustion furnace is used to burn the liquid sulfur and import at least a sulfur product into the heat exchanger. The heat exchanger is used to recycle heat energy generated from burning the liquid sulfur. The sulfur product reacts with hydrogen peroxide within the absorption-reaction tower to produce the sulfuric acid product. The at least a distillation tower is used to concentrate or purify the sulfuric acid product to improve the concentration and purity of the sulfuric acid product. The stripping tower is used to remove sulfur dioxide in the sulfuric acid product. Wherein, a portion of energy needed for operating the sulfur melting tank and the at least a distillation tower can be supplied by recycled heat energy.

Compared to prior arts, the method, apparatus and system for making sulfuric acid in the present invention use hydrogen peroxide and sulfur dioxide to produce sulfuric acid. Thus, not only the hydrogen peroxide used as an oxidant is eliminated through the reaction, which avoids inconvenience of handling waste materials at a later time, but also the concentration of the sulfuric acid in the absorption-reaction tower can simply be higher and higher as the reaction time increases and finally no longer augments when the hydrogen peroxide is depleted, which is contrary to ordinary reduction-oxidation reactions where products are diluted more and more due to generation of water. Moreover, the method and apparatus for making sulfuric acid in the present invention supply the high order heat energy and the low order heat energy respectively to the distillation towers and the sulfur melting tower after sufficiently recycling a large amount of heat energy generated from burning the sulfur. The high order heat energy and the low order heat energy are provided for concentrating and purifying the sulfuric acid product and for melting the sulfur. Even when there is excessive heat energy remained from the high order heat energy and the low order heat energy, the excessive heat energy may be further utilized to generate electric power or for other purposes. Therefore, the apparatus for making sulfuric acid in the present invention forms a self-contained system. In this self-contained system, energy needed for operating the sulfur melting tank and the distillation towers can be afforded by recycling heat energy such that the amount of externally supplied energy is greatly reduced. That is, the self-contained system completely runs in power saving mode. The method, apparatus and system for making sulfuric acid in the present invention are extraordinarily suitable for reproducing new sulfuric acid products from spent acid or waste acid discharged by factories. The disclosed method, apparatus and system not only can stably improve the concentration and purity of the sulfuric acid but also efficiently eliminates and stabilizes the hydrogen peroxide in the waste acid. The produced new sulfuric acid products may be extensively utilized in many industrial processes to achieve goals of power saving, reducing carbon emission, being environmental friendly and alleviating the Earth's burden. And, the additional cost spent by business units on handling waste acid may be reduced too. In addition to replace consumption of fresh products, the produced new products can additionally reduce the manufacturing cost.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
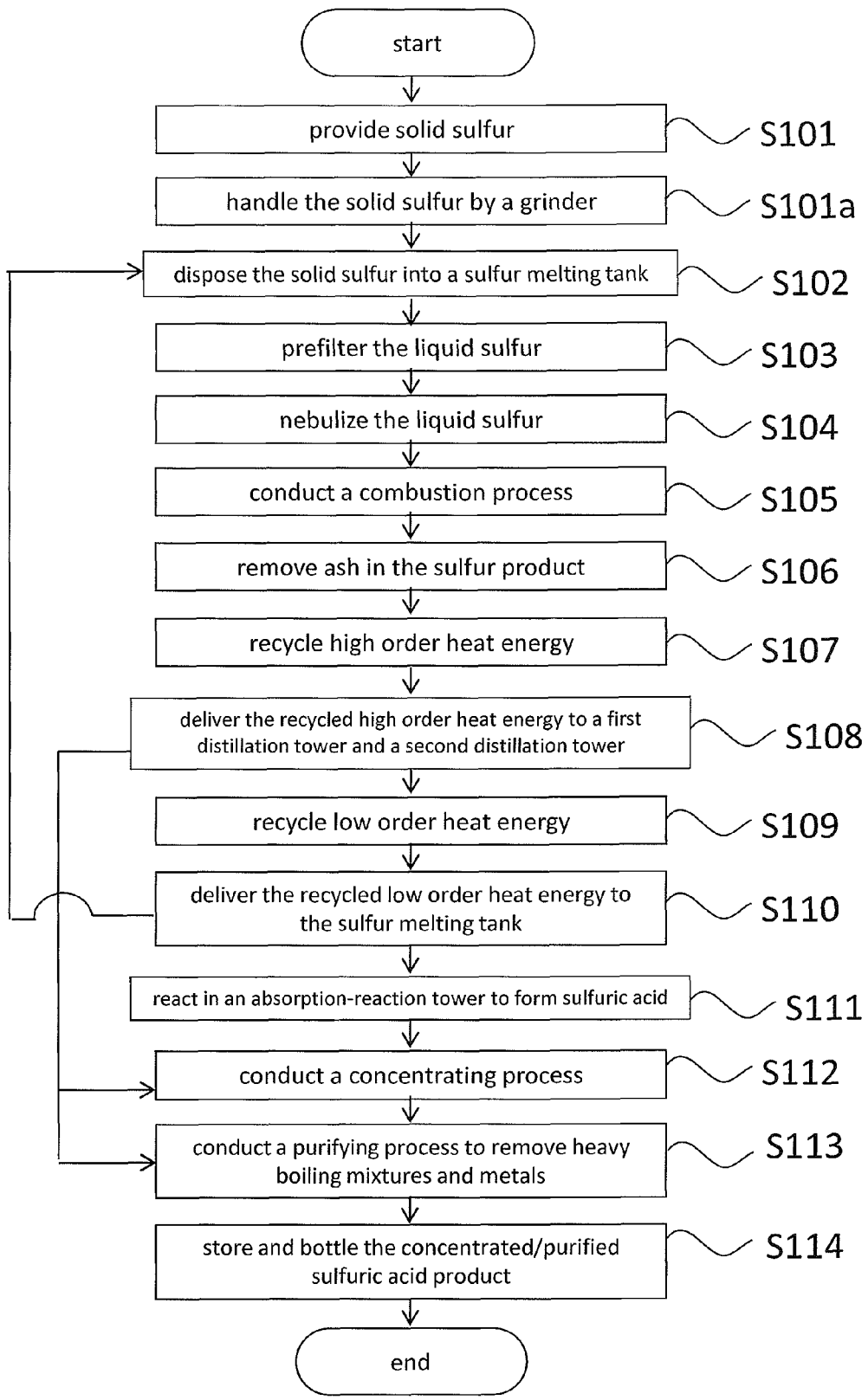
FIG. 1 is a flowchart illustrating a method for making sulfuric acid according to one preferred embodiment of the present invention.

Please refer to FIG. 1; FIG. 1 is a flowchart illustrating a method for making sulfuric acid according to one preferred embodiment of the present invention. As shown in FIG. 1, the method for making sulfuric acid in the present embodiment first provides solid sulfur (step S101).

Then, the solid sulfur is treated by a grinder (step S101a), where grain size of the solid sulfur is adjusted before the solid sulfur is disposed into a sulfur melting tank. After that, the solid sulfur disposed into the sulfur melting tank is melted into liquid sulfur (step S102), to facilitate melting of the solid sulfur. In general, the temperature of the sulfur melting tank is controlled, making the temperature of the melted sulfur fall around 149□, to avoid forming liquid sulfur having a high viscosity and prevent the device from being damaged by the liquid sulfur having a high viscosity.

Following the step S102, the liquid sulfur is prefiltered (step S103). Usually, a basket strainer is used to prefilter the liquid sulfur, which makes the clean liquid pass through but blocks solid impurities in the strainer. Then, a nebulization process is performed to nebulize the prefiltered liquid sulfur (step S104). Here, nebulization means transforming molecules of the liquid sulfur into molecules having much smaller sizes, which is helpful to make the burning more complete and uniform.

A combustion process is then conducted (step S105), and the nebulized sulfur is burned in the combustion furnace. In the step S105, temperature control is relatively important if good results are desired. While a cold furnace is intended for use, the temperature of the furnace must be raised before the furnace is fed with liquid sulfur. Because the combustion is a severe oxidation reaction in which oxygen participates, the combustion releases a large amount of light and heat, causing the temperature of the combustion in this step to be at about 1093□. Since oxygen participates in the reaction, the sulfur reacts with oxygen to form sulfur dioxide ($SO_2$) for reproducing sulfuric acid through further reacting with hydrogen peroxide ($H_2O_2$) in a subsequent step. Besides, if the free energy of a specific reaction is less than zero ($\Delta G<0$), the reaction must be a spontaneous reaction. The free energy is calculated as follows:

$$\Delta G = \Delta H - T \Delta S$$

Wherein, $\Delta H$ is the reaction heat, T is the absolute temperature, and $\Delta G$ is the entropy change. As previous described, a large amount of heat is released from burning the sulfur, so the reaction is an exothermic reaction, i.e. $\Delta H<0$. The entropy is an indicator of chaos, but the combustion increases chaos, i.e. $\Delta S>0$. Substituting $\Delta H<0$ and $\Delta S>0$ into the above equation then obtains a result that $\Delta G$ is definitely less than zero and the reaction is certainly a spontaneous reaction. It is understandable that the only need in the reaction of burning the sulfur for forming sulfur dioxide is to ignite the nature gas. Igniting the nature gas can help combustible materials to reach their ignition points and then automatically burn by themselves without being supplied any additional energy. Also, after the ignition points are reached, the reaction will release a large amount of heat energy.

Subsequently, as shown in FIG. 1, ash in a sulfur product generated from burning the sulfur is removed (step S106) by using a cyclone separator and/or a filter system. The ash in the sulfur product is collected, and the ash-removed sulfur product, i.e. the sulfur dioxide, is then imported into a first waste heat boiler.

Next, high order heat energy is recycled (step S107). A first waste heat boiler is used to recycle a portion of heat energy generated from the above mentioned combustion. In this step, the objective is to recycle the high order heat energy, so the medium, such as thermal medium oil or water, for delivering heat energy may be chosen according to practical situations. The medium absorbs the large amount of heat energy generated from the aforementioned combustion until the temperature of the produced gas is lowered to about 260° C. The recycled high order heat energy is then delivered to a first distillation tower and a second distillation tower (step 108) for subsequent concentrating or purifying purposes.

Afterwards, low order heat energy is recycled (step S109). A second waste heat boiler is used to continue recycling heat energy generated from the above mentioned combustion. Because the high order heat energy has been recycled in the step S107, the objective of the step S109 is to recycle the low order heat energy. Again, the medium, such as thermal medium oil or water, for delivering heat energy may be chosen according to practical situations. The medium continues absorbing a portion of heat energy that hasn't been absorbed by the first waste heat boiler, until the temperature of the produced gas is lowered to about 165° C. The recycled low order heat energy is then delivered to the sulfur melting tank (step S110) for melting the solid sulfur in the step S102. Heat of combustion of sulfur is much greater than its heat of fusion, so energy needed for the sulfur melting tank can be fulfilled simply by recycling the low order heat energy. Specifically, the recycled low order heat energy is enough for transforming all the solid sulfur into the liquid sulfur.

Then, sulfuric acid is formed in an absorption-reaction tower (step S111). In this step, hydrogen peroxide or sulfuric acid containing hydrogen peroxide is provided into the absorption-reaction tower, and sulfuric acid is formed after the sulfur dioxide reacts with the hydrogen peroxide:

$$SO_{2(g)} + H_2O_{2(l)} \rightarrow H_2SO_{4(l)}$$

In the above reaction, the hydrogen peroxide provided into the absorption-reaction tower may come from waste acid discharged by factories, such as waste sulfuric acid containing hydrogen peroxide solution or waste hydrogen peroxide solution discharged during processes of cleaning semiconductors. After the above reaction, a new sulfuric acid product can be produced. The spent acid and waste acid are specially managed and collected for storage. According to recycling and management regulations, the spent acid and waste acid can be reused as raw materials for industrial processes after applying for approval through administrative procedures and being reprocessed. In another aspect, process conditions may be adjusted upon practical situations to obtain satisfactory results. However, sources of the hydrogen peroxide provided into the absorption-reaction tower are not limited to spent acid and waste acid.

Moreover, the waste sulfuric acid containing hydrogen peroxide solution is injected to the bottom circulation tank at the bottom of the absorption-reaction tower. The spent acid is sprayed from the top of the tower through continuously pumping the spent acid in the bottom circulation tank onto the top. The vapor-phase sulfur dioxide rises from the bottom. The vapor-phase sulfur dioxide and the liquid-phase hydrogen peroxide solution continue contacting and reacting with each other. Therefore, the effect of improving the concentration of the sulfuric acid is attained. Since the reaction between the vapor-phase sulfur dioxide and the liquid-phase hydrogen peroxide solution in the tower belongs to an exothermic reaction, a heat exchanger (for example, a water cooler) is used to cool the spent acid in the bottom circulation tank to make the temperature of the bottom keep at about 65° C. before the spent acid is pumped onto the top of the tower. Because boiling point of the sulfuric acid is higher, the sulfuric acid falls into the bottom circulation tank. If a specimen is sampled in the bottom circulation tank and content of the hydrogen peroxide solution in the specimen is detected as zero, the sulfuric acid in the bottom circulation tank is qualified as industrial grade sulfuric acid at low concentration or can enter into a next stage. One thing that should be specially noted is that the concentration of the sulfuric acid in the absorption-reaction tower increases as the reaction time increases and finally no longer augments when the hydrogen peroxide is depleted. The concentration keeps increasing until about 72.1 wt %. This provides two advantages. First, the sulfur dioxide reacts with the hydrogen peroxide in the spent acid or waste acid, which eliminates the hydrogen peroxide in the spent acid or waste acid. Therefore, there is no inconvenience caused by additionally handling hydrogen peroxide at a later time. Second, the concentration of the sulfuric acid is raised to a certain level as the reaction time increases, which accords with industrial requirements for sulfuric acid at medium and high concentrations.

After the industrial grade sulfuric acid at low concentration is produced, a concentrating process is performed (step S112). In the step, the recycled high order heat energy is utilized in the first distillation tower to evaporate water and other light boiling mixtures, whose boiling points are both lower than boiling point of the sulfuric acid, to improve the concentration of the sulfuric acid product until the concentration is greater than or equal to 96 wt %. The sulfuric acid distilled through the first distillation tower is then qualified as industrial grade sulfuric acid at high concentration or can be further imported into a second distillation tower for an additional distillation treatment.

Finally, as shown in step S113, the sulfuric acid distilled through the first distillation tower is introduced into the second distillation tower. The recycled high order heat energy is utilized in the second distillation tower to further remove heavy boiling mixtures or sulfuric acid having a high metal content. The desired sulfuric acid is then distilled from the top of the second distillation tower, and the metal content is 0.1~10 ppb. Thus, the electronic grade sulfuric acid having high quality is produced. If the sulfur dioxide content in the electronic grade sulfuric acid is too high, the sulfur dioxide can be removed by introducing the sulfuric acid to a stripping tower.

It should be noted that the industrial grade sulfuric acid product at low concentration produced, the industrial grade sulfuric acid product at high concentration or the high quality electronic grade sulfuric acid product through the above processes may be directly stored or bottled to prepare for shipping (step S114).

Figure 2:
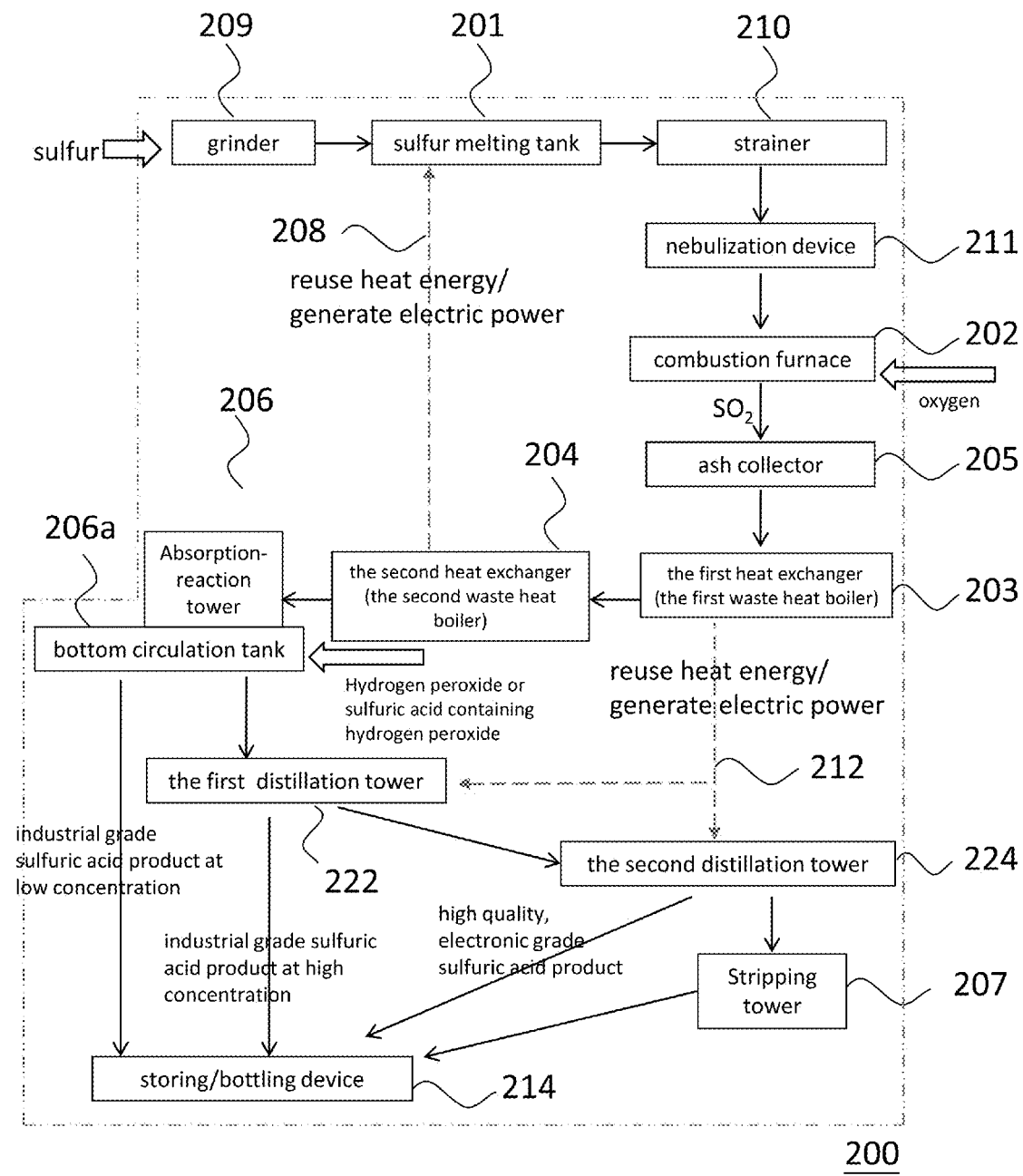
FIG. 2 is a schematic diagram illustrating an apparatus for making sulfuric acid according to one preferred embodiment of the present invention.

In order to implement the method for making sulfuric acid in the above embodiment, FIG. 2 shows a schematic diagram illustrating an apparatus for making sulfuric acid according to one preferred embodiment of the present invention. Please refer to FIG. 2, as shown in FIG. 2, the apparatus 200 for making sulfuric acid in the present embodiment comprises a sulfur melting tank 201, a combustion furnace 202, an ash collector 205, a first heat exchanger 203, a second heat exchanger 204, an absorption-reaction tower 206, a first distillation tower 222, a second distillation tower 224 and a stripping tower 207.

The sulfur melting tank 201 is used to melt the solid sulfur into the liquid sulfur. During melting process, the low order heat energy delivered by a first pipeline 208 is used to overcome heat of fusion of the solid sulfur to complete phase transition of the sulfur. Meanwhile, the temperature of the sulfur melting tank 201 is controlled to make the temperature fall around 149° C. Moreover, the apparatus 200 for making sulfuric acid in the present embodiment further comprises a grinder 209 used to adjust grain size of the solid sulfur to an ideal size and then importing the sulfur into the sulfur melting tank 201.

In order to make the combustion of the sulfur in the combustion furnace cleaner, more uniform and more complete, the apparatus 200 for making sulfuric acid in the present embodiment further comprises a strainer 210 and a nebulization device 211. Usually, the strainer 210 is a basket strainer used to prefilter the liquid sulfur, make the clean liquid pass through and block solid impurities in the strainer. The nebulization device 211 is used to nebulize the prefiltered liquid sulfur, transform molecules of the liquid sulfur into molecules having much smaller sizes and then importing the nebulized sulfur into the combustion furnace 202.

The combustion furnace 202 is used to burn the nebulized sulfur. Temperature control of the combustion furnace 202 is relatively important if good results are desired. While a cold furnace is intended for use, the temperature of the furnace must be raised before the furnace is fed with liquid sulfur. As previously stated, the combustion of the sulfur is a spontaneous reaction, what is needed at the beginning of the combustion reaction is to ignite the nature gas, which can help combustible materials to reach their ignition points and then automatically burn by themselves without being supplied any additional energy. Also, after the ignition points are reached, the reaction will release a large amount of light and heat energy, causing the temperature of the burning to be at about 1093° C. Because oxygen participates in the reaction, the sulfur reacts with oxygen to form oxide, i.e. sulfur dioxide, for further reacting with hydrogen peroxide in a subsequent step.

The ash collector 205 is usually a cyclone separator and/or a filter system used to remove and collect ash in the sulfur product. The ash collector 205 further import the ash-removed sulfur product, i.e. the sulfur dioxide, into the first heat exchanger 203.

The first heat exchanger 203 is used to recycle the high order heat energy. The medium, such as thermal medium oil or water, for delivering heat energy may be chosen according to practical situations. The medium in the first heat exchanger 203 recycles a portion of heat energy generated from the aforementioned combustion until the temperature of the produced gas is lowered to about 260° C. The absorbed high order heat energy is then delivered to the first distillation tower 222 and the second distillation tower 224 through the first pipeline 212 for objectives of improving the concentration and purity. In the present embodiment, the first heat exchanger 203 is a first waste heat boiler.

The second heat exchanger 204 is used to recycle the low order heat energy. The medium, such as thermal medium oil or water, for delivering heat energy may be chosen according to practical situations. The medium in the second heat exchanger 204 continues to absorb remaining heat energy until the temperature of the produced gas is lowered to about 165° C. The recycled low order heat energy is then delivered to the sulfur melting tank 201 through the second pipeline 208. Heat of combustion of sulfur is much greater than its heat of fusion, so energy needed for the sulfur melting tank can be fulfilled simply by recycling the low order heat energy. The recycled low order heat energy is also enough for transforming all the solid sulfur into the liquid sulfur. In the present embodiment, the second heat exchanger 204 is a second waste heat boiler.

In the absorption-reaction tower 206, sulfuric acid is produced after the sulfur dioxide reacts with hydrogen peroxide. The bottom of the absorption-reaction tower 206 includes a bottom circulation tank 206a, which is injected with sulfuric acid containing hydrogen peroxide or hydrogen peroxide solution. The spent acid is sprayed from the top of the tower 206 through continuously pumping the spent acid in the bottom circulation tank 206a onto the top. A heat exchanger (for example, a water cooler) is used to cool the spent acid in the bottom circulation tank 206a to make the temperature of the bottom circulation tank 206a keep at about 65° C. before the spent acid is pumped onto the top of the absorption-reaction tower 206. Because boiling point of the sulfuric acid is higher, the sulfuric acid will fall into the bottom circulation tank 206a. If a specimen is sampled in the bottom circulation tank 206a and content of hydrogen peroxide solution in the specimen is detected as zero, the sulfuric acid in the bottom circulation tank 206a is qualified as industrial grade sulfuric acid at low concentration or can enter into the second distillation tower 224 for a further distillation treatment.

The first distillation tower 222 utilizes the recycled high order heat energy to evaporate water and other boiling mixtures having boiling points lower than that of the sulfuric acid, to further improve the concentration of the sulfuric acid product until the concentration is greater than or equal to 96 wt %. The sulfuric acid distilled through the first distillation tower 222 is then qualified as industrial grade sulfuric acid at high concentration or can be further imported into the second distillation tower 224 for an additional distillation treatment.

The second distillation tower 224 utilizes the recycled high order heat energy to further remove heavy boiling mixtures or sulfuric acid having a high metal content. Heavy boiling mixtures or sulfuric acid having a high metal content is discharged from the bottom of the second distillation tower 224. The desired sulfuric acid is then distilled from the top of the second distillation tower 224, and the electronic grade sulfuric acid having high quality is thus produced. If sulfur dioxide content in the electronic grade sulfuric acid is too high, the sulfur dioxide can be removed by introducing the sulfuric acid into the stripping tower 207.

In order to prepare for shipping, the apparatus 200 for making sulfuric acid in the present invention includes a storing/bottling device 214 for selectively storing and bottling the industrial grade sulfuric acid product at low concentration, the industrial grade sulfuric acid product at high concentration or the high quality electronic grade sulfuric acid product.

The method and apparatus for making sulfuric acid in the present invention mainly recycle the large amount of heat energy generated from burning the sulfur. The method and apparatus then deliver the high order heat energy and the low heat energy separately to the distillation towers and the sulfur melting tank, for improving the concentration or purity and for melting the solid sulfur. In fact, the present invention does not limit application of the recycled heat energy generated from burning the sulfur to the above embodiments, and the present invention may be modified according to practical situations. For example, as described in the above context, heat of combustion of sulfur is to much greater than its heat of fusion, so energy needed for the sulfur melting tank can be fulfilled simply by recycling the low order heat energy. Furthermore, while there is excessive heat energy, the excessive heat energy may still be utilized for other purposes. For example, the excessive heat energy is provided to a pump in a power generating zone to generate electric power. In a similar way, while there is excessive heat energy after supplying the high order heat energy for improving concentration, the excessive heat energy may be utilized to generate electric power as well.

The method and apparatus for making sulfuric acid in the present invention use hydrogen peroxide to react with sulfur dioxide to produce sulfuric acid. As a result, the concentration of the sulfuric acid in the absorption-reaction tower can simply be higher and higher as the reaction time increases and finally no longer augments when the hydrogen peroxide is depleted, which is contrary to ordinary reduction-oxidation reactions where products are diluted more and more due to generation of water. Moreover, the method and apparatus for making sulfuric acid in the present invention supply the high order heat energy and the low order heat energy respectively to the distillation towers and the sulfur melting tower after sufficiently recycling a large amount of heat energy generated from burning the sulfur, for improving the concentration and purity of the sulfuric acid product and for melting the solid sulfur. Even when there is excessive heat energy remained from the high order heat energy and the low order heat energy, the excessive heat energy may still be utilized to generate electric power or for other purposes. Therefore, the apparatus for making sulfuric acid in the present invention forms a self-contained system. In this self-contained system, the generated energy can be recycled for reuse within the system to greatly reduce the amount of externally supplied energy. That is, the self-contained system completely runs in power saving mode. The method, apparatus and system for making sulfuric acid in the present invention are extraordinarily suitable for reproducing new sulfuric acid products from spent acid or waste acid discharged by factories. The disclosed method, apparatus and system not only can stably improve the concentration and purity of the sulfuric acid but also efficiently eliminates and stabilizes the hydrogen peroxide in the waste acid. The produced new sulfuric acid products may be extensively utilized in many industrial processes to achieve goals of power saving, reducing carbon emission, being environmental friendly and alleviating the Earth's burden. And, the additional cost spent by business units on handling waste acid may be reduced too. In addition to replace consumption of fresh products, the produced new sulfuric acid products can even reduce the manufacturing cost.

The method and apparatus for making sulfuric acid in the present invention can produce sulfuric acid products at medium and high concentrations. Such produced sulfuric acid products meet industrial requirements. Because water in the products only occupies an extremely small portion, it is more easy and cost-effective to transport the products. Beside, heat energy generated by the system can be recycled for reuse within the system, so the amount of externally supplied energy is greatly reduced. Therefore, the method, apparatus and system in the present invention all have great cost merits It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for making sulfuric acid, suitable for producing a sulfuric acid product, comprising the following steps:
    a. providing solid sulfur;
    b. melting the solid sulfur in a sulfur melting tank to form liquid sulfur;
    c. burning the liquid sulfur to generate at least a sulfur product;
    d. recycling high order heat energy generated from burning the liquid sulfur;
    e. providing the high order heat energy to a first distillation tower or a second distillation tower;
    f. recycling low order heat energy generated from burning the liquid sulfur;
    g. providing the low order heat energy to the sulfur melting tank;
    h. providing hydrogen peroxide or sulfuric acid containing hydrogen peroxide into an absorption-reaction tower to react with the sulfur product to produce the sulfuric acid product;
    i. concentrating the sulfuric acid product to improve the concentration of the sulfuric acid product;
    j. purifying the sulfuric acid product to improve the purity of the sulfuric acid product;
    k. removing sulfur dioxide in the sulfuric acid product by a stripping tower if sulfur dioxide content in the sulfuric acid product is too high; and
    l. bottling and storing each grade sulfuric acid product.

2. The method as claimed in claim 1, wherein the step a further comprises the following step:
    handling the solid sulfur by a grinder to adjust grain size of the solid sulfur.

3. The method as claimed in claim 1 further comprising the following steps after the step b:
    prefiltering the liquid sulfur; and
    nebulizing the prefiltered liquid sulfur.

4. The method as claimed in claim 1, wherein the sulfur product contains sulfur dioxide.

5. The method as claimed in claim 1, wherein the low order heat energy is provided to the sulfur melting tank to melt the solid sulfur into the liquid sulfur.

6. The method as claimed in claim 1 further comprising the following steps after the step d:
    removing ash in the sulfur product; and
    importing the ash-removed sulfur product into the absorption-reaction tower.

7. The method as claimed in claim 1, wherein the hydrogen peroxide comes from waste acid discharged by a factory or fresh hydrogen peroxide.

8. The method as claimed in claim 1, wherein the step i imports the sulfuric acid product into the first distillation tower for distilling to improve the concentration of the sulfuric acid product.

9. The method as claimed in claim 1, wherein the step j imports the sulfuric acid product into the second distillation tower for distilling to improve the purity of the sulfuric acid product.

10. The method as claimed in claim 1, wherein the step k imports the sulfuric acid product into the stripping tower to remove sulfur dioxide content in the sulfuric acid product.

11. The method as claimed in claim 1 further comprising the step of providing the high order heat energy to the first distillation tower or the second distillation tower after the step e, and wherein the steps i and j import the sulfuric acid product sequentially into the first distillation tower and the second distillation tower for distilling and lowering contents of heavy boiling mixtures and metals to improve the concentration and purity of the sulfuric acid product.

12. The method as claimed in claim 1, wherein the steps a to g may directly use outsourced sulfur dioxide and external energy.

13. An apparatus for making sulfuric acid, suitable for producing a sulfuric acid product, comprising:
    a sulfur melting tank used to melt solid sulfur into liquid sulfur;
    a combustion furnace used to burn the liquid sulfur and importing at least a sulfur product into an absorption-reaction tower;
    a first heat exchanger used to recycle high order heat energy generated from burning the liquid sulfur and delivering the high order heat energy to a first distillation tower and a second distillation tower through a first pipeline;
    a second heat exchanger used to recycle low order heat energy generated from burning the liquid sulfur and delivering the low order heat energy to the sulfur melting tank through a second pipeline;
    the absorption-reaction tower for the sulfur product to react with hydrogen peroxide within the absorption-reaction tower to produce the sulfuric acid product;

the first distillation tower used to concentrate the sulfuric acid product to improve the concentration of the sulfuric acid product;

the second distillation tower used to purify the sulfuric acid product to decrease contents of heavy boiling mixtures and metals so as to improve the purity and quality of the sulfuric acid product; and a stripping tower used to perform a process of removing sulfur dioxide in the sulfuric acid product to decrease sulfur dioxide content in the sulfuric acid product.

14. The apparatus as claimed in claim 13 further comprising a grinder used to adjust grain size of the solid sulfur.

15. The apparatus as claimed in claim 13 further comprising a strainer used to prefilter the liquid sulfur.

16. The apparatus as claimed in claim 15 further comprising a nebulization device used to nebulize the prefiltered liquid sulfur and then importing the nebulized sulfur into the combustion furnace.

17. The apparatus as claimed in claim 13 further comprising an ash collector used to remove ash in the sulfur product and then importing the ash-removed sulfur product into the first heat exchanger.

18. The apparatus as claimed in claim 13, wherein the low order heat energy is delivered to the sulfur melting tank to melt the solid sulfur into the liquid sulfur.

19. The apparatus as claimed in claim 13, wherein the hydrogen peroxide or the sulfuric acid containing hydrogen peroxide comes from fresh hydrogen peroxide or waste acid discharged by a factory.

20. The apparatus as claimed in claim 13, wherein the high order heat energy is delivered to the first distillation tower and/or the second distillation tower for concentrating the sulfuric acid product and decreasing contents of heavy boiling mixtures and metals to improve the concentration and purity of the sulfuric acid product.

21. A system for making sulfuric acid, comprising:

a sulfur melting tank used to melt solid sulfur into liquid sulfur;

a combustion furnace used to burn the liquid sulfur and importing at least a sulfur product into an absorption-reaction tower;

at least a heat exchanger used to recycle heat energy generated from burning the liquid sulfur;

the absorption-reaction tower for the sulfur product to react with hydrogen peroxide within the absorption-reaction tower to produce the sulfuric acid product; and at least a distillation tower used to concentrate or purify the sulfuric acid product to improve the concentration and purity of the sulfuric acid product;

wherein, a portion of energy needed for operating the sulfur melting tank and the at least a distillation tower can be supplied by recycled heat energy.

22. The system as claimed in claim 21 further comprising a grinder used to adjust grain size of the solid sulfur.

23. The system as claimed in claim 21 further comprising a strainer used to prefilter the liquid sulfur.

24. The system as claimed in claim 23 further comprising a nebulization device used to nebulize the prefiltered liquid sulfur and then importing the nebulized sulfur into the combustion furnace.

25. The system as claimed in claim 21 further comprising an ash collector used to remove ash in the sulfur product and then importing the ash-removed sulfur product into the at least a heat exchanger.

26. The system as claimed in claim 21, wherein the recycled heat energy includes high order heat energy and low order heat energy.

27. The system as claimed in claim 26, wherein the high order heat energy is delivered to the at least a distillation tower to improve the concentration or purity of the sulfuric acid product, the rest portion of the high order heat energy remained from improving the concentration or purity of the sulfuric acid product is used to generate electric power or for other recycling purposes, and the low order heat energy is delivered to the sulfur melting tank to melt the solid sulfur into the liquid sulfur.

28. The system as claimed in claim 21, wherein the hydrogen peroxide or the sulfuric acid containing hydrogen peroxide comes from fresh hydrogen peroxide or waste acid discharged by a factory.

29. The system as claimed in claim 21 further comprising a stripping tower used to remove sulfur dioxide in the sulfuric acid product exported from the at least a distillation tower.

* * * * *